(12) United States Patent
Thornér et al.

(10) Patent No.: US 11,822,844 B2
(45) Date of Patent: Nov. 21, 2023

(54) JUST IN TIME DATA-BASED GENERATION OF GRAPHICAL CONTENT

(71) Applicant: ZEMBULA, INC., Portland, OR (US)

(72) Inventors: Carl-Einar Ingemar Thornér, Happy Valley, OR (US); Robert Jenkin Haydock, Portland, OR (US)

(73) Assignee: ZEMBULA, INC., Portland, OR (US)

( * ) Notice: Subject to any disclaimer, the term of this patent is extended or adjusted under 35 U.S.C. 154(b) by 0 days.

(21) Appl. No.: 17/455,550

(22) Filed: Nov. 18, 2021

(65) Prior Publication Data

US 2022/0156025 A1    May 19, 2022

Related U.S. Application Data

(60) Provisional application No. 63/115,714, filed on Nov. 19, 2020.

(51) Int. Cl.
*G06F 3/14* (2006.01)
*G06F 3/0484* (2022.01)

(52) U.S. Cl.
CPC .............. *G06F 3/14* (2013.01); *G06F 3/0484* (2013.01)

(58) Field of Classification Search
None
See application file for complete search history.

(56) References Cited

U.S. PATENT DOCUMENTS

| 11,087,424 | B1 | 8/2021 | Sarkar et al. | |
| 2005/0071757 | A1* | 3/2005 | Ehrich | G06F 16/958 707/E17.116 |
| 2014/0187223 | A1 | 7/2014 | Ivanchenko et al. | |
| 2016/0232701 | A1* | 8/2016 | Drozdyuk | G06T 15/005 |
| 2018/0137542 | A1 | 5/2018 | Pesavento et al. | |
| 2019/0043505 | A1 | 2/2019 | Kurganov | |

FOREIGN PATENT DOCUMENTS

WO    0198925 A2    12/2001

* cited by examiner

*Primary Examiner* — Yi Wang
(74) *Attorney, Agent, or Firm* — Alleman Hall Creasman & Tuttle LLP

(57) ABSTRACT

According to an example, a server-based platform processes requests for graphical content on behalf of client computing devices.

10 Claims, 4 Drawing Sheets

JUST IN TIME DATA-BASED GENERATION OF GRAPHICAL CONTENT

CROSS REFERENCE TO RELATED APPLICATIONS

This application claims priority to U.S. Patent Application Ser. No. 63/115,714, filed Nov. 19, 2020, the entirety of which is hereby incorporated herein by reference for all purposes.

BACKGROUND/SUMMARY

Computer executable application programs can present graphical data to users via a graphical user interface. Local processing of graphical data, including retrieving and rendering of graphical components can consume significant processing resources of the computing platform that executes the application program. Furthermore, application programs that are capable of locally implementing logic for the retrieval and rendering of graphical components can significantly increase the size and complexity of the application program.

DETAILED DESCRIPTION

Figure 1:
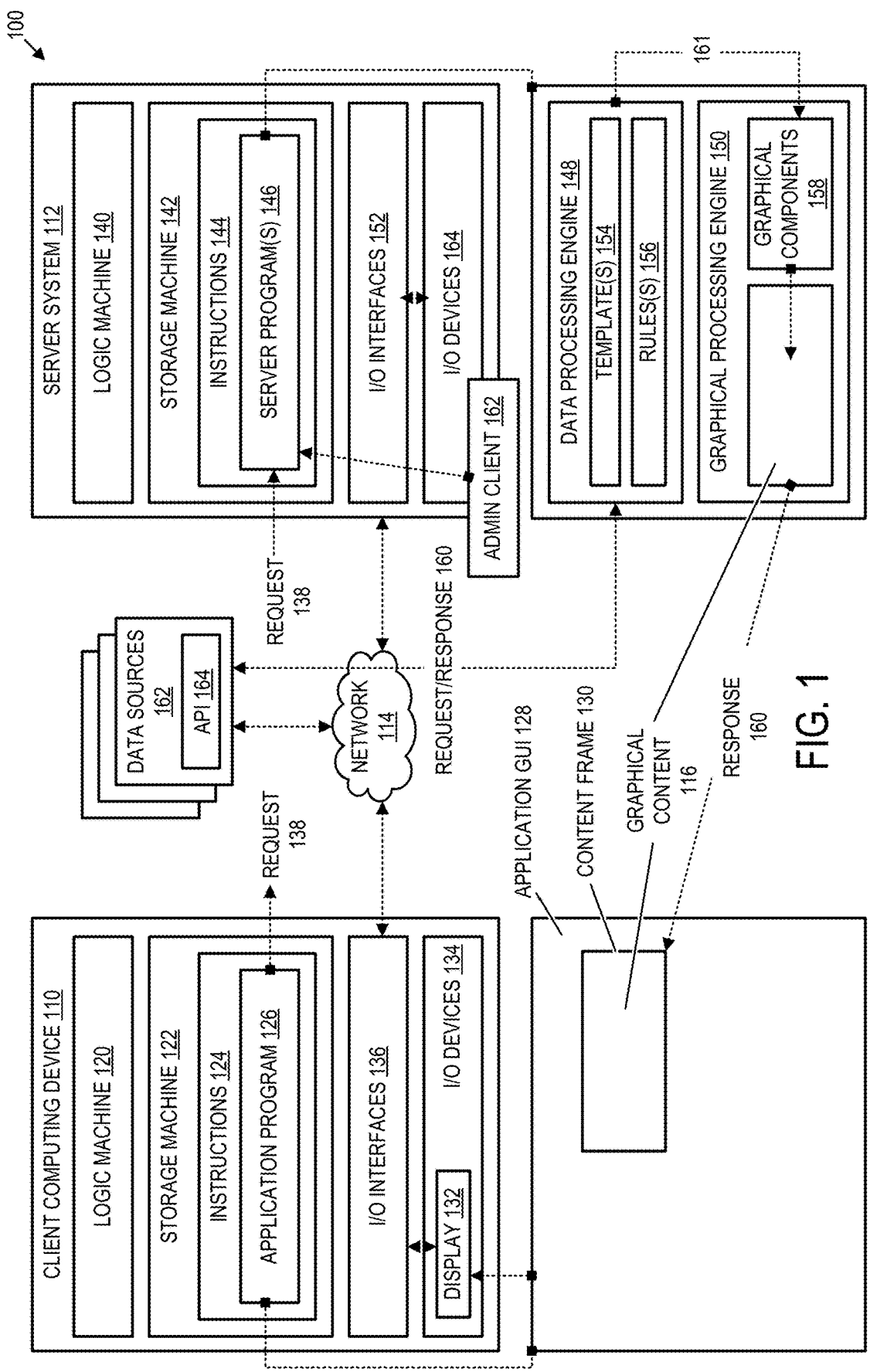
FIG. 1 shows an example computing system.

FIG. 1 shows an example computing system 100 in which a client computing device 110 interacts with a server system 112 via a communications network 114 to obtain graphical content 116 that is presented at the client computing device.

Client computing device 110 is operable by a user, and may take the form of a personal computer, mobile device, computer terminal, gaming system, etc. Client computing device 110 includes a logic machine 120 and a storage machine 122 having instructions 124 stored thereon that are executable by the logic machine to perform one or more of the methods and operations described herein with respect to the client computing device. In an example, instructions 124 includes an application program 126, which take the form of a web browser application, an email application, a messaging application, or other suitable application program that features one or more application graphical user interfaces (GUIs), an example of which includes application GUI 128. Applicant GUI 128 includes a content frame 130 within which graphical content 116 is presented via a graphical display 132 that is included as part of input/output devices 134 of client computing device 110 or otherwise interfaces with client computing device 110 via input/output interfaces 136 (e.g., as a peripheral device). Application program 126 initiates request 138 to server system 112 for graphical content (e.g., graphical content 116) to be generated and returned by server system 112 to the client computing device.

Server system 112 includes one or more server computing devices remotely located from client computing device 110. Request 138 traverses network 114 and is received by server system 112. Server system 112 includes a logic machine 140 and a storage machine 142 having instructions 144 stored thereon that are executable by the logic machine to perform one or more of the methods and operations described herein with respect to the server system. In an example, instructions 144 includes one or more server programs, which can include a data processing engine 148 and a graphical processing engine 150, among other suitable program components. Graphical processing engine 150, as an example, includes or takes the form of a vector image processing engine configured to generate vector graphics, such as images and/or videos. Vector graphics generated by the vector image processing engine can be converted to other forms of graphical content before being transmitted to the client computing device in at least some examples. Such conversion can be performed particularly where the application program that initiated the request at the client computing device does not support vector graphics. Storage machine 142 can also store local data resources, including data and/or graphical components that can be combined with data and/or graphical components obtained from remote data sources to generate graphical content 116.

Data processing engine 148 receives request 138 via input/output interfaces 152. Request 138 can include a variety of contextual information. Contextual information can take various forms, including a URL or other suitable network resource identifier, an identifier of application program 126, a username of a user of client computing device 110, an IP address or other network identifier of the client computing device, a geographic location identifier of the client computing device, a shipping tracking number or other information passed by the application program to the server system via the request, a network location identifier from which other data and/or graphical components may be retrieved by the server system on-behalf of the client computing device, among other suitable forms of contextual information. Accordingly, it will be appreciated that contextual information can include any suitable information that can be used by server system 112 to retrieve and/or or generate graphical components 158 that can be combined to obtain a graphical content item (e.g., graphical content 116).

In response to request 138 including the contextual information indicated by the request, data processing engine 148 implements one or more templates 154 and/or one or more rules 156 to select, request, and receive 160 applicable data from one or more remote data sources 162 and/or local data sources (e.g., of storage machine 142). Remote data sources 162 may be hosted at one or more remote computing devices (e.g., servers). Requests indicated at 160 can take the form of application programming interface (API) requests to an API 164 of each of the one or more data sources 162 to retrieve applicable data. Data processing engine 148 processes the data and/or graphical components received from data sources 162 and/or from local storage by applying one or more of the templates 154 and/or rules 156 to obtain processed data 161. Data processing engine 148 provides processed data 161 to graphical processing engine 150, which in turn generates a plurality of graphical components 158 based on the processed data 161. In at least some examples, data returned by data sources 162, data retrieved from local storage, and/or processed data 161 can include one or more of graphical components 158.

Graphical processing engine 150 utilizes processed data 161 to generate, render, and combine the plurality of graphical components 158 to obtain graphical content 116 at server system 112. The graphical content generated at server system 112 can take the form of one or more vector graphics. Such vector graphics can be converted to non-vector graphic form before being transmitted to the client computing device. The server system 112 then sends graphical content 116 to client computing device 110 as a response 160 that traverses network 114. Client computing device 110 receives response 160, inserts graphical content 116 within content frame 130, and presents the graphical content within application GUI 128 via display 132.

In at least some examples, templates 154 and/or rules 156 can be user defined. As an example, an administrator client 162 (e.g., a user operated client device) can interact with server programs 146 to define aspects of templates 154 and/or rules 156. A non-limiting example of a template/rule set is describe in further detail with reference to FIG. 3. Administrator client 162 can interact with server system 112 via one or more integrated input/output devices or peripheral devices 164 interfacing with input/output interfaces 152, or administrator client 162 can be remotely located as a client computing device that interacts with server system 112 via input/output interfaces 152 over network 114.

Graphical content 116 that can be generated and/or sent to the client computing device by the server system according to the disclosed techniques can take various forms, including: image formats: png, jpg, bmp, gif, webp, apng, mng, flif, heif; and streaming video formats: mp4, mov, wmv, flv, avi, avchd. WebM, MKV, as non-limiting examples.

Figure 2:
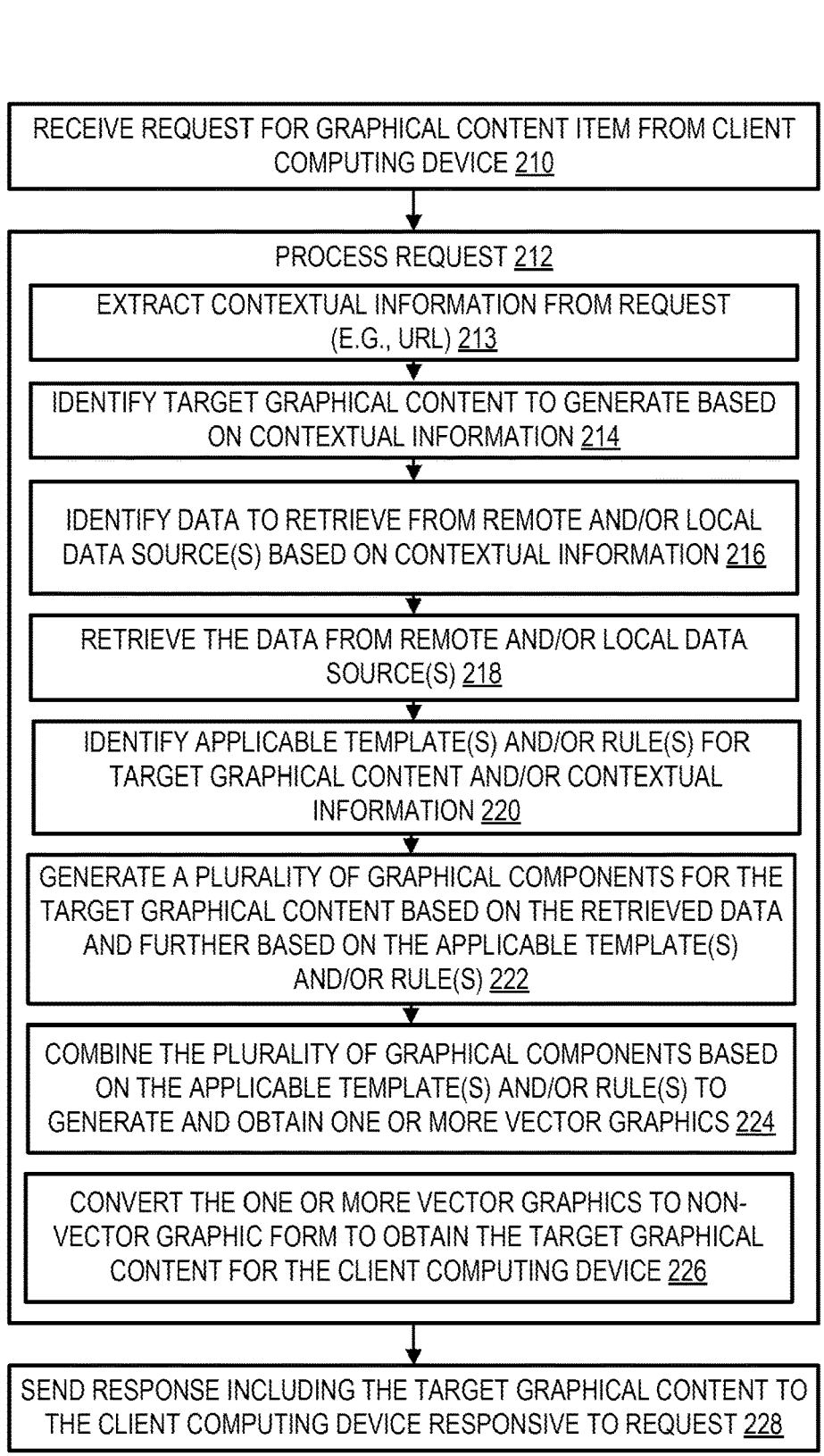
FIG. 2 shows a flow diagram of an example method that can be preformed by aspects of the computing system of FIG. 1.

FIG. 2 shows a flow diagram of an example method 200. In an example, method 200 can be performed by server system 100 of FIG. 1 executing sever programs 146, including data processing engine 148 and graphical processing engine 150.

At 210, the method includes receiving a request (e.g., 138 of FIG. 1) for graphical content from a client computing device, such as client computing device 110 of FIG. 1. In an example, the request can take the form of an HTTP/HTTPS request over TCP/IP. However, other suitable types of requests can be supported.

At 212, the request received at 210 is processed. As part of processing the request at 212, the method can include extracting contextual information from the request at 213. In an example, the contextual information indicates a URL or other network resource identifier. At 214, the method includes identifying target graphical content to generate based on the contextual information, including at least the URL or network resource identifier indicated by the request. In at least some examples, the URL or other network resource identifier identifies the correct client and graphical content to generate and serve in response to the request. Accordingly, at 214, the method includes identifying target graphical content to generate on-behalf of the client computing device based on the context information of the request, including the URL or other network identifier.

For the particular target graphical content identified at 214, contextual information extracted from the request and/or profile data associated with the URL/network resource identifier at the server system is retrieved. Based on the contextual information extracted from the request and/or associated with the URL/network resource identifier, data to be retrieved from remote and/or local sources (e.g., APIs and databases) is identified at 216. For example, one or more requests can be sent to one or more different data sources 162 of FIG. 1. Such requests can include API calls, for example. At 218, the identified data is retrieved from the remote and/or local data sources. Local data sources can refer to data stored at storage machine 142 of FIG. 1, for example. By contrast, remote data sources can again refer to one or more different data sources 162.

In at least some examples, one or more applicable templates and/or one or more rules are identified at 220 from among a plurality of templates 154 and rules 156 based on the target graphical content and/or contextual information. In the case of the target graphical content being a live image or video graphic, multiple templates or template variants can be selected based on both the retrieved data and the contextual information.

At 222, a plurality of graphical components can be generated for the target graphical content based on the retrieved data and the applicable templates and/or rules identified at 220. For example, the contextual information and retrieved data can be used to identify and/or retrieve text fonts, external images, and to calculate any text blocks to generate a vector graphic.

At 224, the plurality of graphical components can be combined into one or more vector graphics for the target graphical content based on the applicable templates and/or rules. In at least some examples, a vector graphic can be generated for each frame of a multi-frame video or live image.

At 226, each vector graphic can be optionally converted to a non-vector graphic form (e.g., png or jpg, or animated gif). This approach may be used in the case where the application program that initiated the request does not support vector graphics. In the case of animated images, the one or more applicable templates can be used to generate multiple image versions for each frame of the animation.

At 228, the graphical content is sent as a response to the client computing device responsive to the request received at 210.

As an example implementation of method 200, data processing engine 148 performs operations 210, 213, 214, 216, 218, 220, and 228; and graphics processing engine 150 performs operations 222, 224, and 226.

Aspects of computing system 100 FIG. 1 and method 200 of FIG. 2 are described in further detail below with reference to various example implementations.

In at least some examples, computing system 100 provides an architecture for generating real-time or near-real-time images and/or videos (e.g., vector graphics) for email, webpages, and apps. The image and/or video is generated after a request is made based on contextual information extracted from data of the image request, or, indirectly with data from databases, APIs, or text files. This improved methodology and architecture generates the images and/or videos by directly stitching together data from different images and/or videos. For example, one image might be generated from a scalable vector graphic (SVG image) that was generated from the data (e.g., includes a first name of a client user or a number of loyalty points associated with an account of the client user), another image might be an image fetched from a server store, a third image might be generated according to a data driven algorithm (e.g., applicable templates and/or rules implemented based on the request from the client) with the available data on a pixel by pixel basis (e.g., a gradient background image). The images, as graphical components, are then merged together according to the applicable rules and/or templates for the data and returned to the requestor within, at the most, a few seconds from when the request was made.

As an example implementation of method 200: (1) a request comes in via HTTP(S) to the server system, (2) the server system fetches details about what data needs to be fetched and any logic to be processed in real-time based on the data, (3) any additional data needed is fetched by the server system from API calls, http requests, databases or text files, (4) logic defined by the templates and/or rules are processed by the server system in combination with the data to determine what the image and/or video should look like, (5) image assets like fonts, images, videos to be used in the generation of the new image are identified and/or obtained by the server system, (6) the images (e.g., one or more) are generated from the data by the server system. The approach of (6) could be generate images either from processing an SVG template and adjusting it to contain elements from the data (e.g., first name, loyalty points, calendar information), or from fetching an image from a data store or HTTP, or from generating the image pixel by pixel based on the data (e.g., a gradient background, or a cloud generated from an algorithm). Next, (7) the images are merged together according to the logic (e.g., templates and/or rules) for that image processed based on the data, and (8) the image is then returned within a few seconds (at the most, often much faster) to the requestor.

The above approach differs from legacy approaches, which use may, for example, use a web rendering engine to render a website based on the data and then screen-capturing the result. By contrast, the approach disclosed herein differs by utilize image-based technology rather than web-based technology to generate the resulting image.

In at least some examples, computing system 100 provides an architecture for generating real-time animated images and streamed video that contain data either passed through the request from the client for the animated image or streamed video or is enriched with data fetched after the initial request for the animated image or streamed video is made. The image/video is processed and generated after the request is made, in the span of no more than a few seconds, often much faster, in contrast to existing data driven animations where the image is preprocessed and the request is simply routed to an existing animation. An example of the disclosed techniques would be implemented when a client user opens their email and the email application requests an image via HTTP protocol. The data indicated by contextual information contained in the request is then used to change the content or motion of the animation that is generated and immediately served back to the requestor.

As an example implementation of method 200: (1) the request for an image or video is generated and received from the client in via HTTP(s), RMTP, or other suitable protocol. The request may contain specifics about the requestor (language preferences, IP address, supported image formats, and other http header data, as well as query parameters to be used directly or indirectly (calling APIs to fetch additional data) in the image (collectively contextual information), (2) the request is routed to a server system with enhanced capabilities to process images/videos, (3) the server data processing routine will fetch any additional data (database lookup, API calls, static text files, etc.) and graphical content (fonts, images, videos, etc.), needed for the image animation before generating each frame needed for the animated image, (4) there are at least two possibilities for generating the images, regardless of the end format (video or image format):
(a) streaming video: images are generated in sequence and fed back to the requestor fast enough to keep up with the framerate or within acceptable real-time buffering parameters (buffers of between a few seconds to less than a minute are usually considered acceptable), and (b) image: after the image frames are generated, the finished image is stitched together and returned as a whole to the requestor within no more than a few seconds of when the request was made.

The above approach differs from existing animations that precompile images before the request is received from the client. The data in this example is routing to the existing pre-processed image. Examples of this approach are countdown timers, where the animated image is processed before the request is made for the image, and the request simply routes the request to the already preprocessed animated image. By contrast, the disclosed techniques enable graphical content to be customized or otherwise tailored to the particular client based on contextual data contained in the request for the graphical content.

Figure 3:
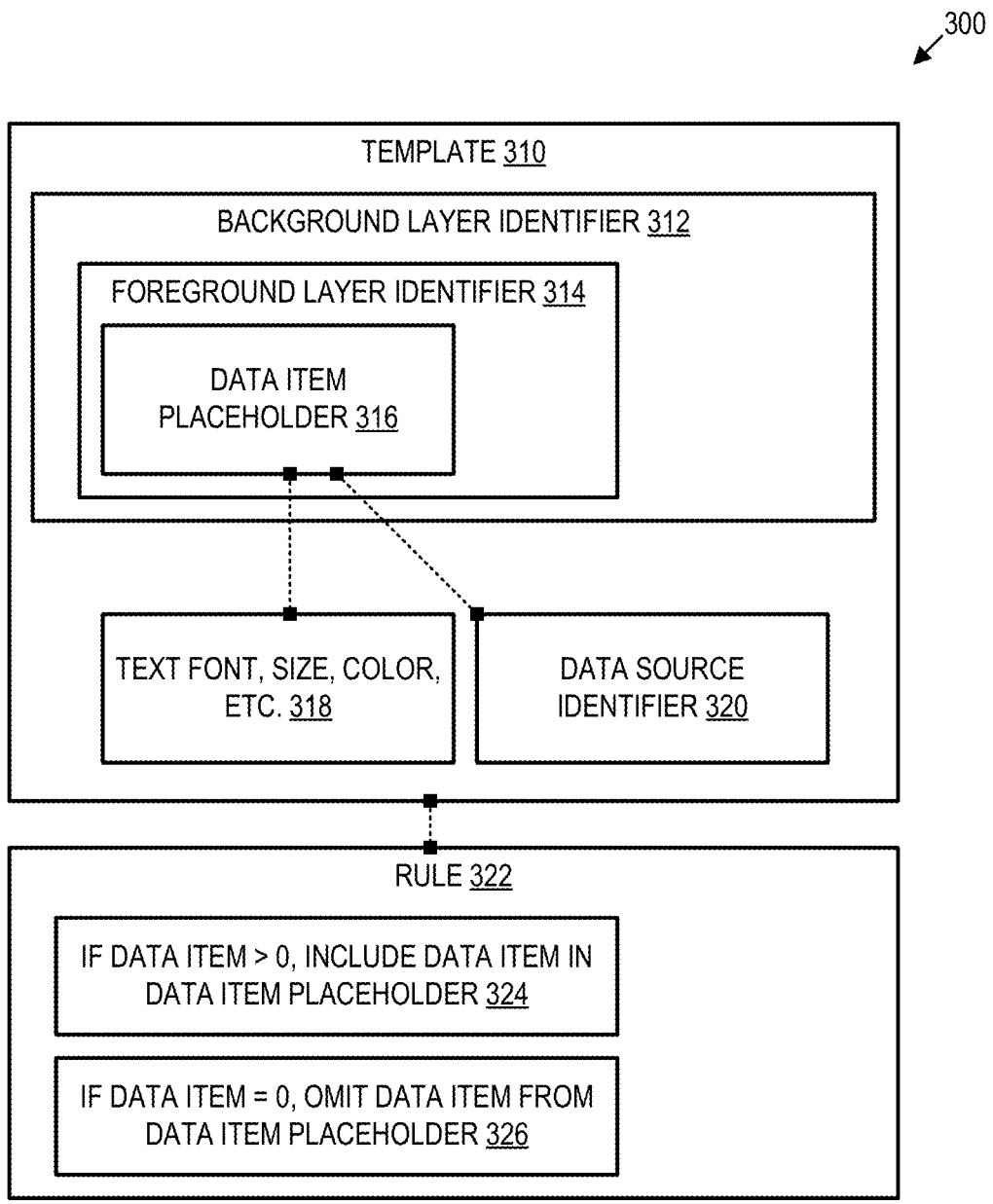
FIG. 3 schematically depict an example template and associated rule that can be implemented by the server system of FIG. 1.

FIG. 3 schematically depict an example template 310 and associated rule 322 that can be implemented by the server system 112 of FIG. 1. Template 310 is a non-limiting example of templates 154 and rule 322 is a non-limiting example of rules 156 of FIG. 1. Template 310 in this example defines a background layer identifier 312 and a foreground layer identifier 314 that respectively identify graphical components for a background layer and a foreground layer of vector graphic 116 of FIG. 1. It will be understood that FIG. 3 is merely a schematic representation of an example graphical content item, and that features such as 314 could have other types of dynamic blocks as well (e.g., an image block with a dynamic image that can be rotated, skewed, etc, or a vector graphic element such as lines, circles, etc.).

Identifiers such as 312 and 314 can be used by data processing engine 148 to retrieve, generate, and/or place the appropriate graphical components from local storage (e.g., storage machine 142) and/or remote data sources 162 when generating the target graphical content. Template 310 further includes a data item placeholder 316 that is associated with a data source identifier 320 from which a data item can be retrieved for inclusion in the data item placeholder 316. Again, identifier 320 can be used by data processing engine 148 to retrieve, generate, and/or place the appropriate graphical components from local storage (e.g., storage machine 142) and/or remote data sources 162. Additionally, in this example, parameters such as text font, size, color, etc. can be defined at 318 as part of template 310. Rule 322 is associated with template 310 in this example, which defines at 324 that if the data item retrieved for data item placeholder 316 is greater than a threshold value of zero, that the data item is to be included in data item placeholder 316, and if that data item is equal to zero, that the data item is to be omitted from data item placeholder 316 as defined at 326. It will be appreciated that other suitable templates and/or rules can be associated with each other, and selectively implemented based on contextual data contained in a request received from a client.

Figure 4A:
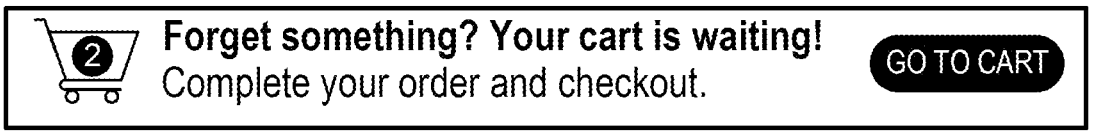
FIGS. 4A, 4B, 5A, 5B, 6A, and 6B depict examples of graphical content that can be generated by the server system of FIG. 1 on behalf of a client computing device.
Figure 4B:
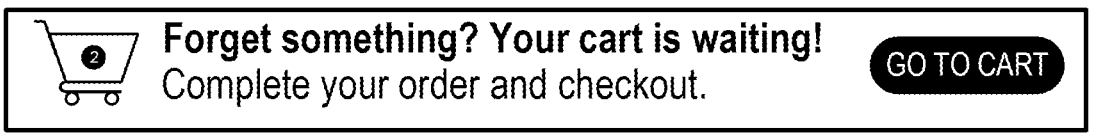

FIGS. 4A and 4B depict an example of graphical content that can be provided to a client using the techniques disclosed herein. In this example, a shopping cart abandonment animation is provided for a data source that includes an e-commerce API to retrieve the number of items in a customer's cart (e.g., 2 items). In FIGS. 4A and 4B, a black circle containing the number of items in the customer's cart expands and contracts as part of an animation. The disclosed techniques enable the animation to include a variety of client-specific information, such as the customer's name, the exact items in the cart, etc. The animation can incorporate or be based on contextual data such as client location, time of day, etc. The animation can incorporate data retrieved from any suitable API data source by the server system.

Figure 5A:
Figure 5B:
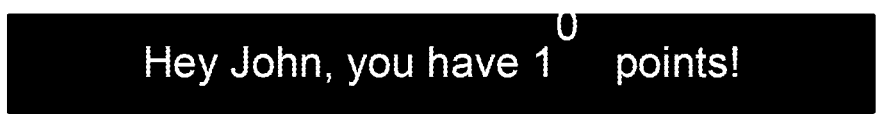

FIGS. 5A and 5B depict another example of graphical content that can be provided to a client using the techniques disclosed herein. In this example, an animated loyalty points banner is provided that includes client-specific information, such as the name of the client user (e.g., John) and a quantity of loyalty points associated with an account of the client user (e.g., 100 points). As an example, the numbers 1, 0, and 0 representing the 100 loyalty points can move into place from outside of the animation frame. Data source being used in this example can include a loyalty API to retrieve customer loyalty points and customer name. The animation can include data from multiple data sources.

Figure 6A:
Figure 6B:

FIGS. 6A and 6B depict another example of graphical content that can be provided to a client using the techniques disclosed herein. In this example, another animation of loyalty points is provided that includes the client user's name (e.g., John), the number of points associated with the client user, and falling confetti as a background layer of the animation. The background layer in this example can originate from a different data source than the points and/or the client name. For example, the background layer can be stored locally at the server system and/or form part of the implemented template, whereas the number of points and the name of the client user can be retrieved from a remote data source.

In some embodiments, the methods and processes described herein may be tied to a computing system of one or more computing devices. In particular, such methods and processes may be implemented as a computer-application program or service, an application-programming interface (API), a library, and/or other computer-program product.

Computing system 100 is shown in simplified form. Computing system 100 may take the form of one or more personal computers, server computers, tablet computers, home-entertainment computers, network computing devices, gaming devices, mobile computing devices, mobile communication devices (e.g., smart phone), and/or other computing devices.

Computing system 100 includes logic machines and a storage machines. Logic machines include one or more physical devices configured to execute instructions. For example, the logic machines may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machines may include one or more processors configured to execute software instructions. Additionally or alternatively, the logic machines may include one or more hardware or firmware logic machines configured to execute hardware or firmware instructions. Processors of the logic machines may be single-core or multi-core, and the instructions executed thereon may be configured for sequential, parallel, and/or distributed processing. Individual components of the logic machines optionally may be distributed among two or more separate devices, which may be remotely located and/or configured for coordinated processing. Aspects of the logic machines may be virtualized and executed by remotely accessible, networked computing devices configured in a cloud-computing configuration.

Storage machines include one or more physical devices configured to hold instructions executable by the logic machines to implement the methods and processes described herein. When such methods and processes are implemented, the state of storage machines may be transformed—e.g., to hold different data. Storage machines may include removable and/or built-in devices. Storage machines may include optical memory, semiconductor memory (e.g., RAM, EPROM, EEPROM, etc.), and/or magnetic memory (e.g., hard-disk drive, floppy-disk drive, tape drive, MRAM, etc.), among others. Storage machines may include volatile, non-volatile, dynamic, static, read/write, read-only, random-access, sequential-access, location-addressable, file-addressable, and/or content-addressable devices. It will be appreciated that storage machines include one or more physical devices. However, aspects of the instructions described herein alternatively may be propagated by a communication medium (e.g., an electromagnetic signal, an optical signal, etc.) that is not held by a physical device for a finite duration.

Aspects of logic machines and storage machines may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 100 implemented to perform a particular function. In some cases, a module, program, or engine may be instantiated via a logic machine executing instructions held by a storage machine. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

It will be appreciated that the term "service" may be used to describe a program executable across multiple user sessions. A service may be available to one or more system components, programs, and/or other services. In some implementations, a service may run on one or more server-computing devices.

When included, a display may be used to present a visual representation of data held by a storage machine. This visual representation may take the form of a GUI. As the herein described methods and processes change the data held by the storage machine, and thus transform the state of the storage machine, the state of the display may likewise be transformed to visually represent changes in the underlying data. A display may include one or more display devices utilizing virtually any type of technology. Such display devices may be combined with a logic machine and/or a storage machine in a shared enclosure, or such display devices may be peripheral display devices.

When included, a communication subsystem of the input/output interfaces may be configured to communicatively couple computing devices of computing system 100 with one or more other computing devices. The communication subsystem may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow devices of computing system 100 to send and/or receive messages to and/or from other devices via a network such as the Internet.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed. The subject matter of the present disclosure includes all novel and non-obvious combinations and subcombinations of the various processes, systems and configurations, and other features, functions, acts, and/or properties disclosed herein, as well as any and all equivalents thereof.

The invention claimed is:

1. A method performed by a server system of one or more server computing devices, the method comprising:
at the server system:
receiving a request for a graphical content item from a client computing device;
extracting contextual information from the request, the contextual information including at least an identifier of an application program executed at the client computing device that does not support vector graphics;
identifying target graphical content to generate based on the contextual information;
retrieving data from one or more data sources based on the contextual information;
identifying one or more applicable templates and/or rules for the target graphical content and/or contextual information;
generating a plurality of graphical components for the target graphical content based on the retrieved data and further based on the one or more applicable templates and/or rules;
combining the plurality of graphical components based on the one or more applicable templates and/or rules to generate and obtain one or more vector graphics that comprises a multi-frame video or live image;
converting the one or more vector graphics to non-vector graphic form to obtain the target graphical content that comprises a dynamic image representation of the multi-frame video or live image for the client computing device; and
sending a response including the target graphical content that comprises the dynamic image representation of the multi-frame video or live image in the non-vector graphic form to the client computing device responsive to the request.

2. The method of claim 1, wherein a remote data source is one of the one or more data sources.

3. The method of claim 1, wherein the contextual information further identifies one or more of:
a network resource identifier, a username of a user of the client computing device, an IP address of the client computing device, a geographic location identifier of the client computing device, a shipping tracking number passed by the application program to the server system via the request, a network location identifier from which data and/or graphical components are to be retrieved by the server system on-behalf of the client computing device.

4. The method of claim 1, wherein the non-vector graphic form of the target graphical content has an image format that includes at least one of: png, jpg, bmp, gif, webp, apng, mng, flif, heif.

5. The method of claim 1, wherein the non-vector graphic form of the target graphical content has a streaming video format that includes at least one of: mp4, mov, wmv, flv, avi, avchd, WebM, MKV.

6. A server system, comprising:
one or more server computing devices having instructions stored thereon executable by the one or more server computing devices to:
receive a request for a graphical content item from a client computing device;
extract contextual information from the request, the contextual information including at least an identifier of an application program executed at the client computing device that does not support vector graphics;
identify target graphical content to generate based on the contextual information;
retrieve data from one or more data sources based on the contextual information;
identify one or more applicable templates and/or rules for the target graphical content and/or contextual information;
generate a plurality of graphical components for the target graphical content based on the retrieved data and further based on the one or more applicable templates and/or rules;
combine the plurality of graphical components based on the one or more applicable templates and/or rules to generate and obtain one or more vector graphics that comprises a multi-frame video or live image;
convert the one or more vector graphics to non-vector graphic form to obtain the target graphical content that comprises a dynamic image representation of the multi-frame video or live image for the client computing device; and
send a response including the target graphical content that comprises the dynamic image representation of the multi-frame video or live image in the non-vector graphic form to the client computing device responsive to the request.

7. The system of claim 6, wherein a remote data source is one of the one or more data sources.

8. The system of claim 6, wherein the contextual information further identifies one or more of:
a network resource identifier, a username of a user of the client computing device, an IP address of the client computing device, a geographic location identifier of the client computing device, a shipping tracking number passed by the application program to the server system via the request, a network location identifier from which data and/or graphical components are to be retrieved by the server system on-behalf of the client computing device.

9. The system of claim 6, wherein the non-vector graphic form of the target graphical content has an image format that includes at least one of: png, jpg, bmp, gif, webp, apng, mng, flif, heif.

10. The system of claim 6, wherein the non-vector graphic form of the target graphical content has a streaming video format that includes at least one of: mp4, mov, wmv, flv, avi, avchd, WebM, MKV.

* * * * *